United States Patent
Shibamura et al.

(10) Patent No.: US 10,563,732 B2
(45) Date of Patent: Feb. 18, 2020

(54) POWER TRANSMISSION DEVICE

(71) Applicant: HONDA MOTOR CO., LTD., Tokyo (JP)

(72) Inventors: Mariko Shibamura, Wako (JP); Soichi Sugino, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 78 days.

(21) Appl. No.: 15/933,557

(22) Filed: Mar. 23, 2018

(65) Prior Publication Data

US 2018/0274633 A1 Sep. 27, 2018

(30) Foreign Application Priority Data

Mar. 23, 2017 (JP) ................................ 2017-057627

(51) Int. Cl.
   *F16H 3/62* (2006.01)
   *F16H 37/08* (2006.01)
   (Continued)

(52) U.S. Cl.
   CPC ............ *F16H 3/62* (2013.01); *F16D 41/125* (2013.01); *F16D 41/16* (2013.01); *F16H 3/66* (2013.01);
   (Continued)

(58) Field of Classification Search
   CPC .. F16D 41/16; F16D 41/125; F16D 2001/103; F16H 3/62; F16H 3/66;
   (Continued)

(56) References Cited

U.S. PATENT DOCUMENTS

| | | | |
|---|---|---|---|
| 8,029,406 B2 * | 10/2011 | Aoki | F16H 3/663 475/282 |
| 8,535,195 B2 * | 9/2013 | Fukaya | F16H 3/66 475/286 |

(Continued)

FOREIGN PATENT DOCUMENTS

| | | |
|---|---|---|
| JP | 2-103554 U | 8/1990 |
| JP | 9-79328 A | 3/1997 |
| JP | 2014-181743 A | 9/2014 |

OTHER PUBLICATIONS

Office Action dated Aug. 21, 2018, issued in counterpart Japanese Application No. 2017-057627, with English translation. (8 pages).

*Primary Examiner* — Leslie A Nicholson, III

(74) *Attorney, Agent, or Firm* — Westerman, Hattori, Daniels & Adrian, LLP

(57) ABSTRACT

A first clutch, a first planetary gear mechanism, a second planetary gear mechanism, a third planetary gear mechanism, a fourth planetary gear mechanism, and a third clutch are arranged along an input shaft in that order from a driving source. The input shaft includes first and second input shafts that are coaxially connected together through a first spline engagement portion and capable of being separated from each other in an axial direction. The first spline engagement portion is disposed between the first clutch and a first element of the third planetary gear mechanism on the input shaft. The first clutch is connected to the first input shaft. The first element of the third planetary gear mechanism and the third clutch are connected to the second input shaft. The first element of the third planetary gear mechanism is removably connected to the second input shaft through a second spline engagement portion.

2 Claims, 7 Drawing Sheets

(51) Int. Cl.
*F16D 41/12* (2006.01)
*F16D 41/16* (2006.01)
*F16H 3/66* (2006.01)
*F16H 57/00* (2012.01)
*F16D 1/10* (2006.01)
*F16H 59/46* (2006.01)
*F16H 57/02* (2012.01)

(52) U.S. Cl.
CPC ... *F16H 37/0826* (2013.01); *F16D 2001/103* (2013.01); *F16H 57/0037* (2013.01); *F16H 2057/02047* (2013.01); *F16H 2059/467* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(58) Field of Classification Search
CPC ............. F16H 37/0826; F16H 57/0037; F16H 2057/02047; F16H 2059/467; F16H 2200/2012; F16H 2200/2046; F16H 2200/2048; F16H 2200/2066; F16H 2200/2082
USPC ........................................................ 475/283
See application file for complete search history.

(56) References Cited

U.S. PATENT DOCUMENTS

| | | | |
|---|---|---|---|
| 8,992,374 B2* | 3/2015 | Shibamura | F16H 3/66 475/276 |
| 9,140,334 B2* | 9/2015 | Sugino | F16H 57/08 |
| 9,255,627 B2* | 2/2016 | Shibamura | F16H 3/66 |
| 9,453,566 B2* | 9/2016 | Loeffler | F16D 1/06 |
| 2018/0334171 A1* | 11/2018 | Michikoshi | B60W 30/20 |

* cited by examiner

| | C1 | C2 | C3 | B1 | B2 | B3 | F1 | TRANSMISSION GEAR RATIO | GEOMETRIC RATIO |
|---|---|---|---|---|---|---|---|---|---|
| Rvs |  |  | ○ |  | ○ |  | L | 4.008 |  |
| 1st |  |  |  | ○ | (○) |  | R/L | 5.233 | |
| 2nd |  | ○ |  | ○ | ○ |  | R | 3.367 | 1.554 |
| 3rd |  |  | ○ | ○ | ○ |  | R | 2.298 | 1.465 |
| 4th |  | ○ | ○ | ○ |  |  | R | 1.705 | 1.348 |
| 5th | ○ | (○) | ○ |  |  |  | R | 1.363 | 1.251 |
| 6th | ○ | ○ | ○ |  |  |  | R | 1.000 | 1.363 |
| 7th | ○ |  | ○ |  | ○ |  | R | 0.786 | 1.273 |
| 8th | ○ | ○ |  |  | ○ |  | R | 0.657 | 1.196 |
| 9th | ○ |  |  |  | ○ | ○ | R | 0.584 | 1.126 |
| 10th | ○ | ○ |  |  |  | ○ | R | 0.520 | 1.120 |

POWER TRANSMISSION DEVICE

CROSS REFERENCES TO RELATED APPLICATIONS

The present application claims priority under 35 U.S.C. § 119 to Japanese Patent Application No. 2017-057627, filed Mar. 23, 2017, entitled "Power Transmission Device." The contents of this application are incorporated herein by reference in their entirety.

BACKGROUND

1. Field

The present disclosure relates to a power transmission device mounted in an automobile.

2. Description of the Related Art

Examples of this type of power transmission device include an automatic transmission in which a plurality of engagement mechanisms are engaged to establish a gear stage (see, for example, Japanese Unexamined Patent Application Publication No. 2014-181743).

This automatic transmission includes an input shaft, an output member, first to fourth planetary gear mechanisms, and first to third clutches. The input shaft is rotatably supported in a transmission case (housing), and is rotated when a driving force is transmitted thereto from a driving source (engine or the like) mounted in a vehicle. Each planetary gear mechanism includes a sun gear, a carrier, and a ring gear.

The first clutch, the sun gear of the third planetary gear mechanism, and the third clutch are integrated with the input shaft and arranged in that order from the driving source. The first planetary gear mechanism and the second planetary gear mechanism are rotatably supported on the outer periphery of the input shaft at a location between the first clutch and the sun gear of the third planetary gear mechanism. The fourth planetary gear mechanism is rotatably supported on the outer periphery of the input shaft at a location between the third clutch and the sun gear of the third planetary gear mechanism.

The above-described automatic transmission according to the related art cannot be smoothly assembled because the first clutch and the sun gear of the third planetary gear mechanism, which are integrally connected to the input shaft, interfere with the first, second, and fourth planetary gear mechanisms during assembly.

The components can be assembled together without interference therebetween by preparing an input shaft that is dividable into pieces, attaching the components to the divided pieces of the input shaft, and integrating them together to complete the assembly.

Although the assembly efficiency can be increased by using the input shaft that is dividable into pieces, there is a risk that the durability of the input shaft will be reduced when, for example, the divided portions of the input shaft receive a relatively high torque from the driving source.

SUMMARY

The present application describes a power transmission device in which an input shaft can be divided into pieces while inhibiting a reduction in the durability of the input shaft and which can be efficiently assembled.

[1] A power transmission device according to an aspect of the present disclosure includes an input shaft (for example, input shaft 11 of the embodiment; the same applies hereinafter) that is rotatably supported in a housing (for example, transmission case 10 of the embodiment; the same applies hereinafter) and that rotates when a driving force is transmitted to the input shaft from a driving source (for example, engine E of the embodiment; the same applies hereinafter) mounted in a vehicle; an output member (for example, output member 13 of the embodiment; the same applies hereinafter); first to fourth planetary gear mechanisms, each including three elements that are a sun gear (for example, sun gears Sa to Sd of the embodiment; the same applies hereinafter), a carrier (for example, carriers Ca to Cd of the embodiment; the same applies hereinafter), and a ring gear (for example, ring gears Ra to Rd of the embodiment; the same applies hereinafter); and a plurality of engagement mechanisms. The three elements of the third planetary gear mechanism (for example, third planetary gear mechanism PG3 of the embodiment; the same applies hereinafter) are defined as a first element (for example, sun gear Sc of the embodiment; the same applies hereinafter), a second element (for example, carrier Cc of the embodiment; the same applies hereinafter), and a third element (for example, ring gear Rc of the embodiment; the same applies hereinafter) in an order in which the elements are arranged from one side of an alignment chart at intervals corresponding to a gear ratio. The three elements of the fourth planetary gear mechanism (for example, fourth planetary gear mechanism PG4 of the embodiment; the same applies hereinafter) are defined as a fourth element (for example, ring gear Rd of the embodiment; the same applies hereinafter), a fifth element (for example, carrier Cd of the embodiment; the same applies hereinafter), and a sixth element (for example, sun gear Sd of the embodiment; the same applies hereinafter) in an order in which the elements are arranged from one side of an alignment chart at intervals corresponding to a gear ratio. The three elements of the first planetary gear mechanism (for example, first planetary gear mechanism PG1 of the embodiment; the same applies hereinafter) are defined as a seventh element (for example, sun gear Sa of the embodiment; the same applies hereinafter), an eighth element (for example, carrier Ca of the embodiment; the same applies hereinafter), and a ninth element (for example, ring gear Ra of the embodiment; the same applies hereinafter) in an order in which the elements are arranged from one side of an alignment chart at intervals corresponding to a gear ratio. The three elements of the second planetary gear mechanism (for example, second planetary gear mechanism PG2 of the embodiment; the same applies hereinafter) are defined as a tenth element (for example, ring gear Rb of the embodiment; the same applies hereinafter), an eleventh element (for example, carrier Cb of the embodiment; the same applies hereinafter), and a twelfth element (for example, sun gear Sb of the embodiment; the same applies hereinafter) in an order in which the elements are arranged from one side of an alignment chart at intervals corresponding to a gear ratio. The first element is connected to the input shaft. The tenth element is connected to the output member. A first connection unit (for example, first connection unit Cc-Cd-Ra of the embodiment; the same applies hereinafter) is formed by connecting the second element, the fifth element, and the ninth element together. A second connection unit (for example, second connection unit Rc-Sb of the embodiment; the same applies hereinafter) is formed by connecting the third element and the twelfth element together. A third connection unit (for example, third connection unit Ca-Cb of the embodiment; the same applies hereinafter) is famed by connecting the eighth element and the eleventh element together. The engagement mechanisms include first to third clutches, first and second brakes, and another brake. The first clutch (for example, first clutch C1 of the embodiment; the same applies hereinafter) is switchable between a connected state in which the first element and the third connection unit are connected and a released state in which the first element and the third connection unit are disconnected. The second clutch (for example, second clutch C2 of the embodiment; the same applies hereinafter) is switchable between a connected state in which the second connection unit and the sixth element are connected and a released state in which the second connection unit and the sixth element are disconnected. The third clutch (for example, third clutch C3 of the embodiment; the same applies hereinafter) is switchable between a connected state in which the first element and the fourth element are connected and a released state in which the first element and the fourth element are disconnected. The first brake (for example, first brake B1 of the embodiment; the same applies hereinafter) is switchable between a fixed state in which the seventh element is fixed to the housing and a released state in which the seventh element is released from the housing. The second brake (for example, second brake B2 of the embodiment; the same applies hereinafter) is switchable between a fixed state in which the sixth element is fixed to the housing and a released state in which the sixth element is released from the housing. The other brake (for example, two-way clutch F1 of the embodiment; the same applies hereinafter) is switchable between a fixed state in which the third connection unit is fixed to the housing and a released state in which the third connection unit is released from the housing. The first clutch, the first planetary gear mechanism, the second planetary gear mechanism, the third planetary gear mechanism, the fourth planetary gear mechanism, and the third clutch are arranged along the input shaft in that order from the driving source. The input shaft includes a first input shaft (for example, first input shaft 11a of the embodiment; the same applies hereinafter) and a second input shaft (for example, second input shaft 11b of the embodiment; the same applies hereinafter) that are coaxially connected together through a first spline engagement portion (for example, first spline engagement portion SPL1 of the embodiment; the same applies hereinafter) and that are capable of being separated from each other in an axial direction. The first spline engagement portion is disposed between the first clutch and the first element of the third planetary gear mechanism on the input shaft. The first clutch is connected to the first input shaft. The first element of the third planetary gear mechanism and the third clutch are connected to the second input shaft. The first element of the third planetary gear mechanism is removably connected to the second input shaft through a second spline engagement portion (for example, second spline engagement portion SPL2 of the embodiment; the same applies hereinafter). The terms "connection unit" may also be simply referred to as a "connection" in this application.

According to the present disclosure, the input shaft includes the first input shaft and the second input shaft, which are connected together by the first spline engagement portion. Therefore, the planetary gear mechanisms can be easily installed into the housing. More specifically, the first input shaft to which the first clutch is connected is connected to the second input shaft after the second input shaft, the second clutch, and the first to fourth planetary gear mechanisms are installed into the housing. Accordingly, the components can be smoothly assembled without interfering with the first clutch.

In addition, according to the present disclosure, the first element of the third planetary gear mechanism is connected to the second input shaft by the second spline engagement portion. Therefore, the first element of the third planetary gear mechanism can be removably attached to the second input shaft. Accordingly, in the case where, for example, the fourth planetary gear mechanism interferes with the first element of the third planetary gear mechanism when installed between the third planetary gear mechanism and the third clutch, the fourth planetary gear mechanism is installed while the first element of the third planetary gear mechanism is removed from the second input shaft. Then, the first element of the third planetary gear mechanism is attached to the second input shaft. Accordingly, the first element of the third planetary gear mechanism can be prevented from interfering with the fourth planetary gear mechanism. Thus, the assembly can be facilitated.

The first spline engagement portion is disposed on the input shaft at a position where the torque applied by the driving source is at a minimum. The second spline engagement portion is disposed at a position where the input shaft (second input shaft) is connected to the first element of the third planetary gear mechanism. The torque applied by the driving source at the position of the second spline engagement portion is lower than that at the position where the input shaft (first input shaft) is connected to the first clutch and the position where the input shaft (second input shaft) is connected to the third clutch. Accordingly, reduction in durability due to the first spline engagement portion and the second spline engagement portion can be inhibited.

[2] According to another aspect of the present disclosure, the input shaft may include a first input shaft and a second input shaft that are coaxially connected together through a spline engagement portion and that are capable of being separated from each other in an axial direction. The spline engagement portion (for example, first spline engagement portion SPL1 of the embodiment) may be disposed between the first clutch and the first element of the third planetary gear mechanism on the input shaft. The first clutch may be connected to the first input shaft. The first element of the third planetary gear mechanism and the third clutch may be connected to the second input shaft.

[3] According to another aspect of the present disclosure, the first clutch, the first element of the third planetary gear mechanism, and the third clutch may be connected to the input shaft, and the first element of the third planetary gear mechanism may be removably connected to the input shaft through a spline engagement portion (for example, second spline engagement portion SPL2 of the embodiment).

DESCRIPTION OF THE PREFERRED EMBODIMENTS

Figure 1:
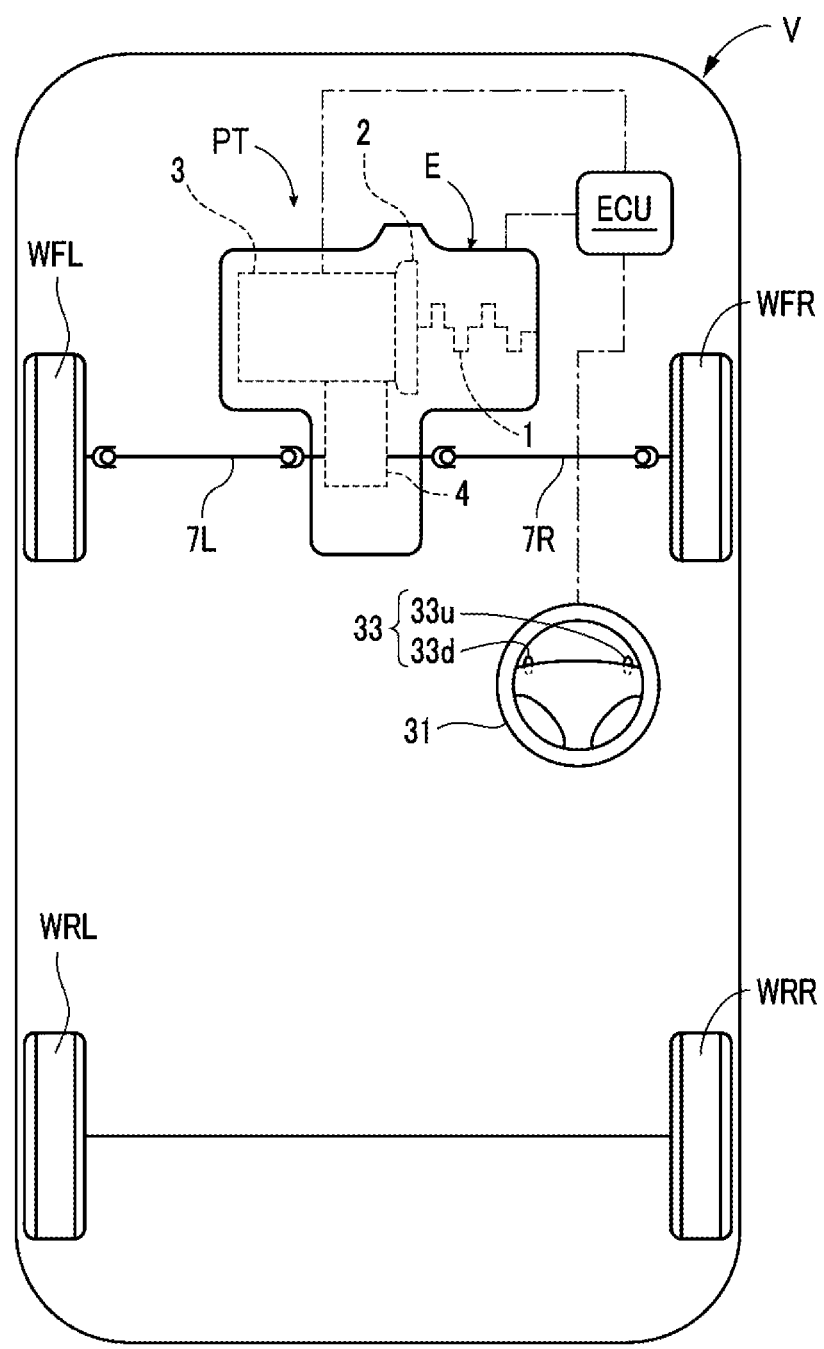
FIG. 1 is a schematic diagram of a vehicle including a power transmission device according to an embodiment of the present disclosure.

An embodiment of the present disclosure will be described with reference to the drawings. As illustrated in FIG. 1, a vehicle V includes a power transmission device PT according to the present embodiment and an engine E arranged so that a crankshaft 1 extends in a left-right direction of a vehicle body. The engine E is an internal combustion engine, which is a driving source. An electric motor may be used instead of the engine E.

A driving force output by the engine E is transmitted to the power transmission device PT. The power transmission device PT adjust the driving force of the engine E in correspondence with a selected transmission gear ratio, and transmits the adjusted driving force to left and right front wheels WFL and WFR.

The power transmission device PT includes a torque converter 2 connected to the crankshaft 1, an automatic transmission 3 connected to the torque converter 2, and a front differential gear 4 connected to the automatic transmission 3. The power transmission device PT having the above-described structure is controlled by a transmission control device ECU.

The front differential gear 4 is connected to the left and right front wheels WFL and WFR by left and right front axles 7L and 7R.

Figure 2:
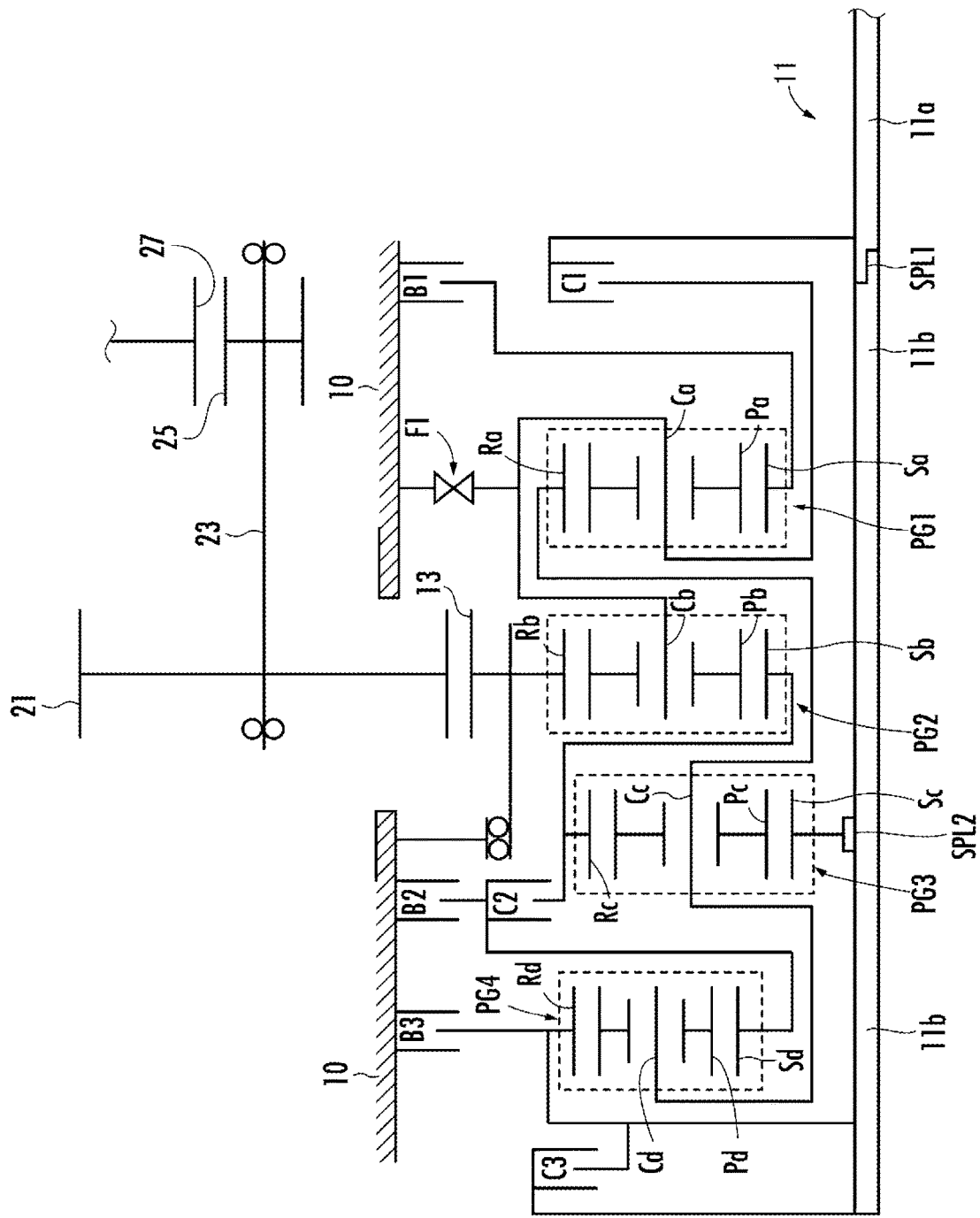
FIG. 2 is a skeleton diagram of a transmission mechanism that serves as the power transmission device according to the embodiment.

FIG. 2 is a skeleton diagram of the automatic transmission 3. The automatic transmission 3 includes an input shaft 11 and an output member 13. The input shaft 11 serves as an input member and is rotatably supported in a transmission case 10, which serves as a housing. The output member 13 is formed of an output gear that is concentric to the input shaft 11. The input shaft 11 receives the driving force from the engine E through the torque converter 2, which includes a lock-up clutch and a damper.

The rotation of the output member 13 is transmitted to left and right driving wheels of the vehicle (front wheels WFL and WFR) through an idle gear 21 that meshes with the output member 13, an idle shaft 23 that supports the idle gear 21, a final drive gear 25 supported by the idle shaft 23, and the front differential gear 4 that supports a final driven gear 27 that meshes with the final drive gear 25.

A frictionally engageable single-plate or multiplate starting clutch may be provided instead of the torque converter 2. The automatic transmission 3 may also be applied to a rear wheel drive vehicle by connecting a propeller shaft to the automatic transmission 3 instead of the front differential gear 4. In addition, the automatic transmission 3 may also be applied to a four wheel drive vehicle by connecting a propeller shaft to the front differential gear 4 through a transfer.

First to fourth planetary gear mechanisms PG1 to PG4 are arranged concentrically with the input shaft 11 in that order from the engine E in the transmission case 10. The third planetary gear mechanism PG3 is a so-called single-pinion planetary gear mechanism including a sun gear Sc, a ring gear Rc, and a carrier Cc that supports pinions Pc, which mesh with the sun gear Sc and the ring gear Rc, so as to enable rotation and revolution of the pinions Pc.

In the so-called single-pinion planetary gear mechanism, when the carrier is fixed and the sun gear is rotated, the ring gear rotates in a direction different from the rotation direction of the sun gear. Therefore, the single-pinion planetary gear mechanism is referred to also as a minus planetary gear mechanism or a negative planetary gear mechanism. In the so-called single-pinion planetary gear mechanism, when the ring gear is fixed and the sun gear is rotated, the carrier is rotated in the same direction as the rotation direction of the sun gear.

Figure 3:
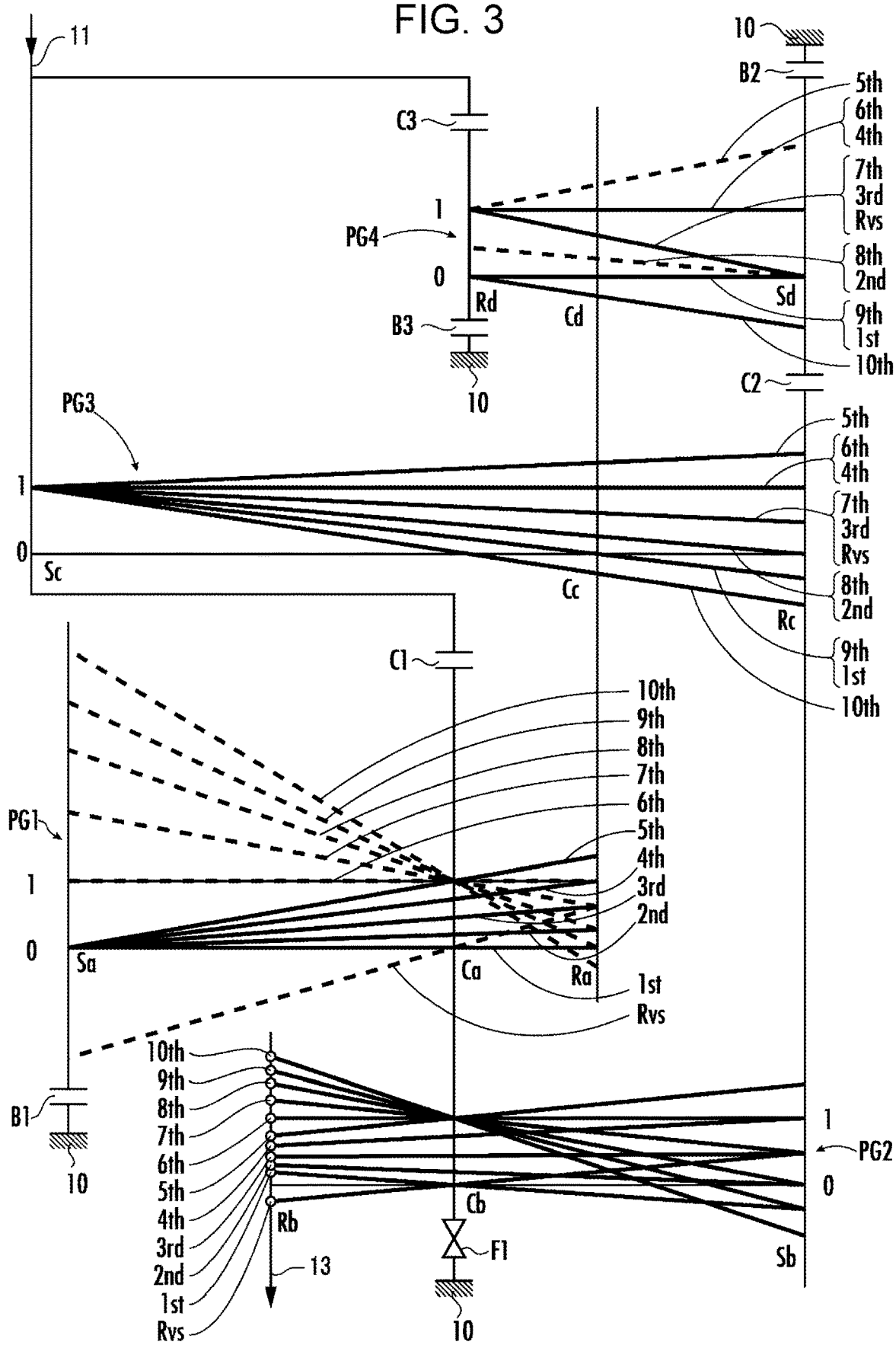
FIG. 3 shows alignment charts of the transmission mechanism that serves as the power transmission device according to the embodiment.

In FIG. 3, the second part from the top shows an alignment chart of the third planetary gear mechanism PG3 (chart in which straight lines (speed lines) represent the ratios between the relative rotational speeds of the three elements, which are the sun gear, the carrier, and the ring gear). Referring to the alignment chart, assume that the three elements Sc, Cc, and Rc of the third planetary gear mechanism PG3 are defined as a first element, a second element, and a third element in the order in which they are arranged from the left side of the alignment chart at intervals corresponding to the gear ratio (ratio of the number of teeth of the ring gear to the number of teeth of the sun gear). In this case, the first element is the sun gear Sc, the second element is the carrier Cc, and the third element is the ring gear Rc.

The ratio of the interval between the sun gear Sc and the carrier Cc to the interval between the carrier Cc and the ring gear Rc is set to h:1, where h is the gear ratio of the third planetary gear mechanism PG3. In the alignment chart, the lower horizontal line and the upper horizontal line (line that coincides with the line of 4th and 6th) show the cases where the rotational speed is "0" and "1" (rotational speed equal to that of the input shaft 11).

The fourth planetary gear mechanism PG4 is also a so-called single-pinion planetary gear mechanism including a sun gear Sd, a ring gear Rd, and a carrier Cd that supports pinions Pd, which mesh with the sun gear Sd and the ring gear Rd, so as to enable rotation and revolution of the pinions Pd.

In FIG. 3, the first part from the top (uppermost part) shows an alignment chart of the fourth planetary gear mechanism PG4. Referring to the alignment chart, assume that the three elements Sd, Cd, and Rd of the fourth planetary gear mechanism PG4 are defined as a fourth element, a fifth element, and a sixth element in the order in which they are arranged from the left side of the alignment chart at intervals corresponding to the gear ratio. In this case, the fourth element is the ring gear Rd, the fifth element is the carrier Cd, and the sixth element is the sun gear Sd. The ratio of the interval between the sun gear Sd and the carrier Cd to the interval between the carrier Cd and the ring gear Rd is set to i:1, where i is the gear ratio of the fourth planetary gear mechanism PG4.

The first planetary gear mechanism PG1 is also a so-called single-pinion planetary gear mechanism including a sun gear Sa, a ring gear Ra, and a carrier Ca that supports pinions Pa, which mesh with the sun gear Sa and the ring gear Ra, so as to enable rotation and revolution of the pinions Pa.

In FIG. 3, the third part from the top shows an alignment chart of the first planetary gear mechanism PG1. Referring to the alignment chart, assume that the three elements Sa, Ca, and Ra of the first planetary gear mechanism PG1 are defined as a seventh element, an eighth element, and a ninth element in the order in which they are arranged from the left side of the alignment chart at intervals corresponding to the gear ratio. In this case, the seventh element is the sun gear Sa, the eighth element is the carrier Ca, and the ninth element is the ring gear Ra. The ratio of the interval between the sun gear Sa and the carrier Ca to the interval between the carrier Ca and the ring gear Ra is set to j:1, where j is the gear ratio of the first planetary gear mechanism PG1.

The second planetary gear mechanism PG2 is also a so-called single-pinion planetary gear mechanism including a sun gear Sb, a ring gear Rb, and a carrier Cb that supports pinions Pb, which mesh with the sun gear Sb and the ring gear Rb, so as to enable rotation and revolution of the pinions Pb.

In FIG. 3, the fourth part from the top (lowermost part) shows an alignment chart of the second planetary gear mechanism PG2. Referring to the alignment chart, assume that the three elements Sb, Cb, and Rb of the second planetary gear mechanism PG2 are defined as a tenth element, an eleventh element, and a twelfth element in the order in which they are arranged from the left side of the alignment chart at intervals corresponding to the gear ratio. In this case, the tenth element is the ring gear Rb, the eleventh element is the carrier Cb, and the twelfth element is the sun gear Sb. The ratio of the interval between the sun gear Sb and the carrier Cb to the interval between the carrier Cb and the ring gear Rb is set to k:1, where k is the gear ratio of the second planetary gear mechanism PG2.

The sun gear Sc (first element) of the third planetary gear mechanism PG3 is connected to the input shaft 11 (second input shaft 1lb described below). The ring gear Rb (tenth element) of the second planetary gear mechanism PG2 is connected to the output member 13 famed of an output gear.

The carrier Cc (second element) of the third planetary gear mechanism PG3, the carrier Cd (fifth element) of the fourth planetary gear mechanism PG4, and the ring gear Ra (ninth element) of the first planetary gear mechanism PG1 are connected together to form a first connection unit Cc-Cd-Ra. The ring gear Rc (third element) of the third planetary gear mechanism PG3 and the sun gear Sb (twelfth element) of the second planetary gear mechanism PG2 are connected together to form a second connection unit Rc-Sb. The carrier Ca (eighth element) of the first planetary gear mechanism PG1 and the carrier Cb (eleventh element) of the second planetary gear mechanism PG2 are connected together to form a third connection unit Ca-Cb.

The automatic transmission according to the present embodiment includes seven engagement mechanisms including first to third clutches C1 to C3, first to third brakes B1 to B3, and a two-way clutch F1.

The first clutch C1 is a hydraulic wet multiplate clutch, and is switchable between a connected state in which the sun gear Sc (first element) of the third planetary gear mechanism PG3 and the third connection unit Ca-Cb are connected and a released state in which they are disconnected. The input side of the first clutch C1 is connected to the input shaft 11 (first input shaft 11a described below).

The third clutch C3 is a hydraulic wet multiplate clutch, and is switchable between a connected state in which the sun gear Sc (first element) of the third planetary gear mechanism PG3 and the ring gear Rd (fourth element) of the fourth planetary gear mechanism PG4 are connected and a released state in which they are disconnected.

The second clutch C2 is a hydraulic wet multiplate clutch, and is switchable between a connected state in which the sun gear Sd (sixth element) of the fourth planetary gear mechanism PG4 and the second connection unit Rc-Sb are connected and a released state in which they are disconnected.

The two-way clutch F1 has a function of another brake according to the present disclosure, and is switchable between a reverse-rotation preventing state, in which the third connection unit Ca-Cb is enabled to rotate in a forward direction (the same direction as the rotation direction of the input shaft 11 and the output member 13) and prevented from rotating in a reverse direction, and a fixed state, in which the third connection unit Ca-Cb is fixed to the transmission case 10.

While the two-way clutch F1 is in the reverse-rotation preventing state, the third connection unit Ca-Cb is set to a released state and enabled to rotate if a rotating force is applied thereto in the forward direction, and is set to a fixed state and fixed to the transmission case 10 if a rotating force is applied thereto in the reverse rotation. In the present embodiment, the two-way clutch F1 corresponds to a switching mechanism.

The first brake B1 is a hydraulic wet multiplate brake, and is switchable between a fixed state in which the sun gear Sa (seventh element) of the first planetary gear mechanism PG1 is fixed to the transmission case 10 and a released state in which it is released from the transmission case 10.

The second brake B2 is a hydraulic wet multiplate brake, and is switchable between a fixed state in which the sun gear Sd (sixth element) of the fourth planetary gear mechanism PG4 is fixed to the transmission case 10 and a released state in which it is released from the transmission case 10. The third brake B3 is a hydraulic wet multiplate brake, and is switchable between a fixed state in which the ring gear Rd (fourth element) of the fourth planetary gear mechanism PG4 is fixed to the transmission case 10 and a released state in which it is released from the transmission case 10.

The state of each of the clutches C1 to C3, the brakes B1 to B3, and the two-way clutch F1 is switched based on vehicle information including the speed of the vehicle by the transmission control device ECU including a transmission control unit (TCU) illustrated in FIG. 1.

The transmission control device ECU is constituted by an electronic unit including a CPU and a memory (not shown). The transmission control device ECU is capable of receiving predetermined vehicle information including the speed and accelerator position of the vehicle V, the rotational speed and output torque of the engine E, and operation information of a paddle shift lever 33, and controls the automatic transmission 3 (transmission mechanism) by causing the CPU to execute a control program stored in a storage device, such as the memory.

As illustrated in FIG. 1, a steering wheel 31 of the vehicle V according to the present embodiment includes the paddle shift lever 33. The paddle shift lever 33 includes a right paddle 33$u$ that is moved forward for manual upshifting and a left paddle 33$d$ that is moved forward for manual downshifting. An operation signal of the paddle shift lever 33 is transmitted to the transmission control device ECU.

The operation unit for the manual operation according to the present disclosure is not limited to the paddle shift lever 33 according to the embodiment, and may instead be another operation unit, such as a shift lever disposed between the driver's seat and front passenger's seat or a button provided on the steering wheel.

As illustrated in FIG. 2, the first clutch C1, the first planetary gear mechanism PG1, the second planetary gear mechanism PG2, the third planetary gear mechanism PG3, the second clutch C2, the fourth planetary gear mechanism PG4, and the third clutch C3 are arranged along the axial line of the input shaft 11 in that order from the engine E and the torque converter 2.

The third brake B3 is disposed on the radially outer side of the fourth planetary gear mechanism PG4, the second brake B2 is disposed on the radially outer side of the second clutch C2, the first brake B1 is disposed on the radially outer side of the first clutch C1, and the two-way clutch F1 is disposed on the radially outer side of the first planetary gear mechanism PG1.

When the three brakes B1 to B3 and the two-way clutch F1 are disposed on the radially outer sides of the planetary gear mechanisms and the clutches as described above, the axial length of the automatic transmission 3 is shorter than that in the case where the brakes B1 to B3 and the two-way clutch F1 are arranged along the axial line of the input shaft 11 together with the planetary gear mechanisms and the clutches. The third brake B3 may instead be disposed on the radially outer side of the third clutch C3, and the second brake B2 may instead be disposed on the radially outer side of the fourth planetary gear mechanism PG4.

Operations for establishing each gear stage of the automatic transmission 3 according to the embodiment will now be described with reference to FIGS. 3 and 4.

To establish a first gear stage, the two-way clutch F1 is set to the reverse-rotation preventing state (R in FIG. 4), and the first brake B1 and the second brake B2 are set to the fixed state. Since the two-way clutch F1 is set to the reverse-rotation preventing state (R) and the first brake B1 is set to the fixed state, the third connection unit Ca-Cb and the sun gear Sa (seventh element) of the first planetary gear mechanism PG1 are prevented from rotating in the reverse direction, so that the rotational speeds of the third connection unit Ca-Cb and the sun gear Sa (seventh element) of the first planetary gear mechanism PG1 are set to "0".

Accordingly, the seventh to ninth elements Sa, Ca, and Ra of the first planetary gear mechanism PG1 are set to a locked state in which they are not rotatable relative to each other, and the rotational speed of the first connection unit Cc-Cd-Ra including the ring gear Ra (ninth element) of the first planetary gear mechanism PG1 is also set to "0". The rotational speed of the ring gear Rb (tenth element) of the second planetary gear mechanism PG2, to which the output member 13 is connected, is set to "1st" in FIG. 3. Thus, the first gear stage is established.

Although the first gear stage can be established without setting the second brake B2 to the fixed state, the second brake B2 is set to the fixed state in the first gear stage to enable a smooth shift from the first gear stage to a second gear stage, which will be described below. In the case where engine braking is to be applied in the first gear stage, the two-way clutch F1 may be switched from the reverse-rotation preventing state (R) to the fixed state (L).

To establish the second gear stage, the two-way clutch F1 is set to the reverse-rotation preventing state (R), the first brake B1 and the second brake B2 are set to the fixed state, and the second clutch C2 is set to the connected state. Since the two-way clutch F1 is set to the reverse-rotation preventing state, the third connection unit Ca-Cb is enabled to rotate in the forward direction. Since the first brake B1 is set to the fixed state, the rotational speed of the sun gear Sa (seventh element) of the first planetary gear mechanism PG1 is set to "0". Since the second brake B2 is set to the fixed state, the rotational speed of the sun gear Sd (sixth element) of the fourth planetary gear mechanism PG4 is set to "0".

Since the second clutch C2 is set to the connected state, the rotational speed of the second connection unit Rc-Sb is equal to the rotational speed of the sun gear Sd (sixth element) of the fourth planetary gear mechanism PG4, and is therefore set to "0". The rotational speed of the ring gear Rb (tenth element) of the second planetary gear mechanism PG2, to which the output member 13 is connected, is set to "2nd" in FIG. 3. Thus, the second gear stage is established.

To establish a third gear stage, the two-way clutch F1 is set to the reverse-rotation preventing state, the first brake B1 and the second brake B2 are set to the fixed state, and the third clutch C3 is set to the connected state. Since the two-way clutch F1 is set to the reverse-rotation preventing state, the third connection unit Ca-Cb is enabled to rotate in the forward direction. Since the first brake B1 is set to the fixed state, the rotational speed of the sun gear Sa (seventh element) of the first planetary gear mechanism PG1 is set to "0". Since the second brake B2 is set to the fixed state, the rotational speed of the sun gear Sd (sixth element) of the fourth planetary gear mechanism PG4 is set to "0".

Since the third clutch C3 is set to the connected state, the rotational speed of the ring gear Rd (fourth element) of the fourth planetary gear mechanism PG4 is equal to the rotational speed of the sun gear Sc (first element) of the third planetary gear mechanism PG3, which is connected to the input shaft 11, and is therefore set to "1". Since the rotational speed of the sun gear Sd (sixth element) of the fourth planetary gear mechanism PG4 is "0" and the rotational speed of the ring gear Rd (fourth element) is "1", the rotational speed of the carrier Cd (fifth element), that is, the rotational speed of the first connection unit Cc-Cd-Ra, is set to $i/(i+1)$.

The rotational speed of the ring gear Rb (tenth element) of the second planetary gear mechanism PG2, to which the output member 13 is connected, is set to "3rd" in FIG. 3. Thus, the third gear stage is established.

To establish a fourth gear stage, the two-way clutch F1 is set to the reverse-rotation preventing state, the first brake B1 is set to the fixed state, and the second clutch C2 and the third clutch C3 are set to the connected state. Since the two-way clutch F1 is set to the reverse-rotation preventing state, the third connection unit Ca-Cb is enabled to rotate in the forward direction. Since the first brake B1 is set to the fixed state, the rotational speed of the sun gear Sa (seventh element) of the first planetary gear mechanism PG1 is set to "0".

Since the second clutch C2 is set to the connected state, the sun gear Sd (sixth element) of the fourth planetary gear mechanism PG4 and the second connection unit Rc-Sb rotate at the same speed. Accordingly, in the third planetary gear mechanism PG3 and the fourth planetary gear mechanism PG4, the carrier Cc (second element) and the carrier Cd (fifth element) are connected to each other, and the ring gear Rc (third element) and the sun gear Sd (sixth element) are connected to each other. Thus, in the fourth gear stage, in which the second clutch C2 is set to the connected state, a single alignment chart including four elements may be drawn for the third planetary gear mechanism PG3 and the fourth planetary gear mechanism PG4.

Since the third clutch C3 is set to the connected state, the rotational speed of the ring gear Rd (fourth element) of the fourth planetary gear mechanism PG4 is equal to the rotational speed of the sun gear Sc (first element) of the third planetary gear mechanism PG3, and is therefore set to "1". Thus, two of the four elements of the third planetary gear mechanism PG3 and the fourth planetary gear mechanism PG4 have the same rotational speed of "1".

Therefore, the elements of the third planetary gear mechanism PG3 and the fourth planetary gear mechanism PG4 are set to a locked state in which they are not rotatable relative to each other, and the rotational speed of all of the elements included in the third planetary gear mechanism PG3 and the fourth planetary gear mechanism PG4 is set to "1". The rotational speed of the third connection unit Ca-Cb is set to j/(j+1), and the rotational speed of the ring gear Rb (tenth element) of the second planetary gear mechanism PG2, to which the output member 13 is connected, is set to "4th" in FIG. 3. Thus, the fourth gear stage is established.

To establish a fifth gear stage, the two-way clutch F1 is set to the reverse-rotation preventing state, the first brake B1 is set to the fixed state, and the first clutch C1 and the third clutch C3 are set to the connected state. Since the two-way clutch F1 is set to the reverse-rotation preventing state, the third connection unit Ca-Cb is enabled to rotate in the forward direction. Since the first brake B1 is set to the fixed state, the rotational speed of the sun gear Sa (seventh element) of the first planetary gear mechanism PG1 is set to "0".

Since the first clutch C1 is set to the connected state, the rotational speed of the third connection unit Ca-Cb is equal to the rotational speed of the sun gear Sc (first element) of the third planetary gear mechanism PG3, and is therefore set to "1". The rotational speed of the ring gear Rb (tenth element) of the second planetary gear mechanism PG2, to which the output member 13 is connected, is set to "5th" in FIG. 3. Thus, the fifth gear stage is established.

The fifth gear stage may be established without setting the third clutch C3 to the connected state. However, the third clutch C3 needs to be set to the connected state in the fourth gear stage and a sixth gear stage, which will be described below. Therefore, the third clutch C3 is set to the connected state in the fifth gear stage to enable a smooth downshift from the fifth gear stage to the fourth gear stage and a smooth upshift from the fifth gear stage to the sixth gear stage.

To establish the sixth gear stage, the two-way clutch F1 is set to the reverse-rotation preventing state, and the first to third clutches C1 to C3 are set to the connected state. Since the two-way clutch F1 is set to the reverse-rotation preventing state, the third connection unit Ca-Cb is enabled to rotate in the forward direction.

Since the second clutch C2 and the third clutch C3 are set to the connected state, as in the fourth gear stage described above, the elements of the third planetary gear mechanism PG3 and the fourth planetary gear mechanism PG4 are not rotatable relative to each other, and the rotational speed of the second connection unit Rc-Sb is set to "1". Since the first clutch C1 is set to the connected state, the rotational speed of the third connection unit Ca-Cb is also set to "1".

Accordingly, the carrier Cb (eleventh element) and the sun gear Sb (twelfth element) of the second planetary gear mechanism PG2 have the same rotational speed of "1", and the elements of the second planetary gear mechanism PG2 are set to a locked state in which they are not rotatable relative to each other. The rotational speed of the ring gear Rb (tenth element) of the second planetary gear mechanism PG2, to which the output member 13 is connected, is set to "6th" in FIG. 3, which is "1". Thus, the sixth gear stage is established.

To establish a seventh gear stage, the two-way clutch F1 is set to the reverse-rotation preventing state, the second brake B2 is set to the fixed state, and the first clutch C1 and the third clutch C3 are set to the connected state. Since the two-way clutch F1 is set to the reverse-rotation preventing state, the third connection unit Ca-Cb is enabled to rotate in the forward direction.

Since the second brake B2 is set to the fixed state, the rotational speed of the sun gear Sd (sixth element) of the fourth planetary gear mechanism PG4 is set to "0". Since the third clutch C3 is set to the connected state, the rotational speed of the ring gear Rd (fourth element) of the fourth planetary gear mechanism PG4 is equal to the rotational speed of the sun gear Sc (first element) of the third planetary gear mechanism PG3, and is therefore set to "1", and the rotational speed of the first connection unit Cc-Cd-Ra including the carrier Cd (fifth element) of the fourth planetary gear mechanism PG4 is set to i/(i+1).

Since the first clutch C1 is set to the connected state, the rotational speed of the third connection unit Ca-Cb is equal to the rotational speed of the sun gear Sc (first element) of the third planetary gear mechanism PG3, which is connected to the input shaft 11, and is therefore set to "1". The rotational speed of the ring gear Rb (tenth element) of the second planetary gear mechanism PG2, to which the output member 13 is connected, is set to "7th" in FIG. 3. Thus, the seventh gear stage is established.

To establish an eighth gear stage, the two-way clutch F1 is set to the reverse-rotation preventing state, the second brake B2 is set to the fixed state, and the first clutch C1 and the second clutch C2 are set to the connected state. Since the two-way clutch F1 is set to the reverse-rotation preventing state, the third connection unit Ca-Cb is enabled to rotate in the forward direction.

Since the second brake B2 is set to the fixed state, the rotational speed of the sun gear Sd (sixth element) of the fourth planetary gear mechanism PG4 is set to "0". Since the second clutch C2 is set to the connected state, the rotational speed of the second connection unit Rc-Sb is equal to the rotational speed of the sun gear Sd (sixth element) of the fourth planetary gear mechanism PG4, and is therefore set to "0".

Since the first clutch C1 is set to the connected state, the rotational speed of the third connection unit Ca-Cb is equal to the rotational speed of the sun gear Sc (first element) of the third planetary gear mechanism PG3, and is therefore set to "1". The rotational speed of the ring gear Rb (tenth element) of the second planetary gear mechanism PG2, to which the output member 13 is connected, is set to "8th" in FIG. 3. Thus, the eighth gear stage is established.

To establish a ninth gear stage, the two-way clutch F1 is set to the reverse-rotation preventing state, the second brake B2 and the third brake B3 are set to the fixed state, and the first clutch C1 is set to the connected state. Since the two-way clutch F1 is set to the reverse-rotation preventing state, the third connection unit Ca-Cb is enabled to rotate in the forward direction.

Since the second brake B2 is set to the fixed state, the rotational speed of the sun gear Sd (sixth element) of the fourth planetary gear mechanism PG4 is set to "0". Since the third brake B3 is set to the fixed state, the rotational speed of the ring gear Rd (fourth element) of the fourth planetary gear mechanism PG4 is also set to "0". Therefore, the elements Sd, Cd, and Rd of the fourth planetary gear mechanism PG4 are set to a locked state in which they are not rotatable relative to each other, and the rotational speed of the first connection unit Cc-Cd-Ra including the carrier Cd (fifth element) of the fourth planetary gear mechanism PG4 is also set to "0".

Since the first clutch C1 is set to the connected state, the rotational speed of the third connection unit Ca-Cb is equal to the rotational speed of the sun gear Sc (first element) of the third planetary gear mechanism PG3, and is therefore set to "1". The rotational speed of the ring gear Rb (tenth element) of the second planetary gear mechanism PG2, to which the output member 13 is connected, is set to "9th" in FIG. 3. Thus, the ninth gear stage is established.

To establish a tenth gear stage, the two-way clutch F1 is set to the reverse-rotation preventing state, the third brake B3 is set to the fixed state, and the first clutch C1 and the second clutch C2 are set to the connected state. Since the two-way clutch F1 is set to the reverse-rotation preventing state, the third connection unit Ca-Cb is enabled to rotate in the forward direction.

Since the second clutch C2 is set to the connected state, the second connection unit Rc-Sb and the sun gear Sd (sixth element) of the fourth planetary gear mechanism PG4 rotate at the same speed. Since the third brake B3 is set to the fixed state, the rotational speed of the ring gear Rd (fourth element) of the fourth planetary gear mechanism PG4 is set to "0". Since the first clutch C1 is set to the connected state, the rotational speed of the third connection unit Ca-Cb is equal to the rotational speed of the sun gear Sc (first element) of the third planetary gear mechanism PG3, and is therefore set to "1". The rotational speed of the ring gear Rd (tenth element) of the second planetary gear mechanism PG2, to which the output member 13 is connected, is set to "10th" in FIG. 3. Thus, the tenth gear stage is established.

To establish a reverse gear stage, the two-way clutch F1 is set to the fixed state (L in FIG. 4), the second brake B2 is set to the fixed state, and the third clutch C3 is set to the connected state. Since the second brake B2 is set to the fixed state and the third clutch C3 is set to the connected state, the rotational speed of the first connection unit Cc-Cd-Ra is set to i/(i+1). Since the two-way clutch F1 is set to the fixed state, the rotational speed of the third connection unit Ca-Cb is set to "0". The rotational speed of the ring gear Rb (tenth element) of the second planetary gear mechanism PG2, to which the output member 13 is connected, is set to "Rvs" for reverse rotation in FIG. 3. Thus, the reverse gear stage is established.

In FIG. 3, the speed lines indicated by the broken lines show that among the elements of the four planetary gear mechanisms PG1 to PG4, the elements of the planetary gear mechanisms that do not transmit power rotate in an idle manner so as to follow the planetary gear mechanisms that transfer power.

Figures 4, 5:
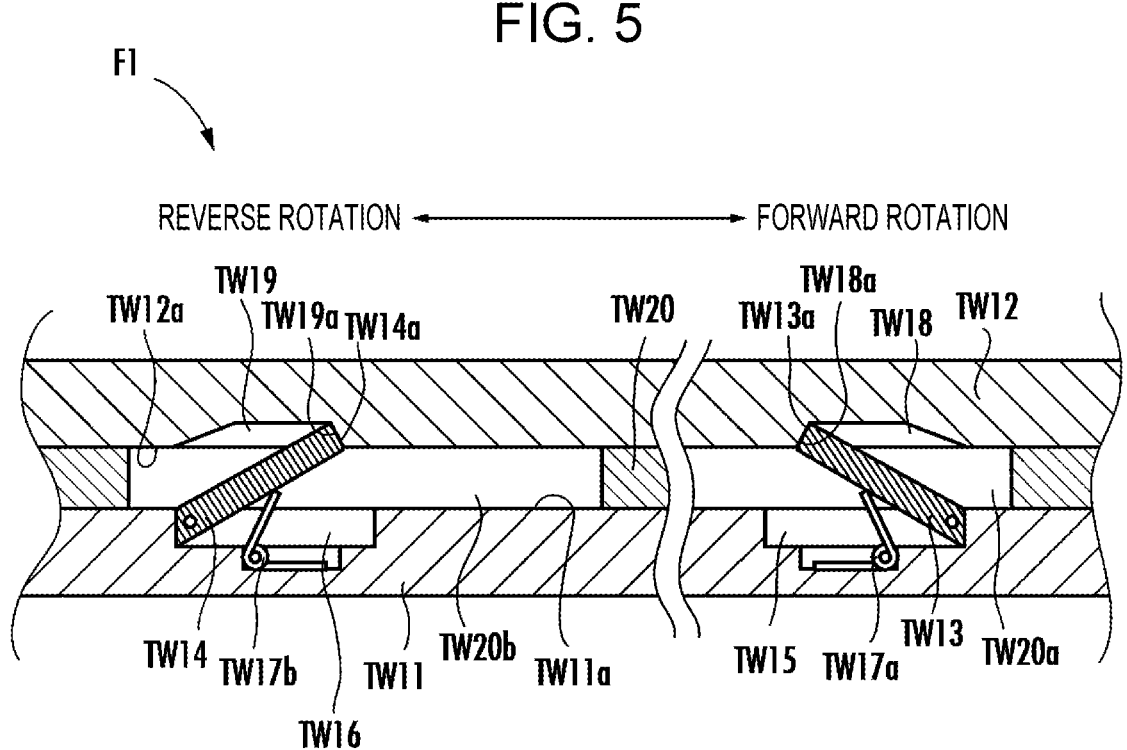
FIG. 4 is a table illustrating the engagement state of each engagement mechanism in each gear stage according to the embodiment.
FIG. 5 is a sectional view illustrating a two-way clutch according to the embodiment in a fixed state.

FIG. 4 is a table showing the states of the clutches C1 to C3, the brakes B1 to B3, and the two-way clutch F1 in each of the above-described gear stages. In the columns of the first to third clutches C1 to C3 and the first to third brakes B1 to B3, "0" indicates the connected state or the fixed state, and the blank cells indicate the released state. In addition, in the column of the two-way clutch F1, "R" indicates the reverse-rotation preventing state and "L" indicates the fixed state.

The underlined letters "R" and "L" indicate that the rotational speed of the third connection unit Ca-Cb is set to "0" due to the operation of the two-way clutch F1. In addition, "R/L" shows that the reverse-rotation preventing state represented by "R" is normally set, but is switched to the fixed state represented by "L" during engine braking.

FIG. 4 also shows the transmission gear ratio of each gear stage and the geometric ratio in the case where the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. The transmission gear ratio of each gear stage is the ratio of the rotational speed of the input shaft 11 to the rotational speed of the output member 13. The geometric ratio is the ratio between the transmission gear ratios of the gear stages, that is, a value obtained by dividing the transmission gear ratio of each gear stage by the transmission gear ratio of the next higher gear stage. Thus, the geometric ratio can be appropriately set.

The two-way clutch F1 will now be described in detail with reference to FIGS. 5 to 8. The two-way clutch F1 is switchable between a fixed state in which the third connection unit Ca-Cb is fixed to the transmission case 10 and a reverse-rotation preventing state in which the third connection unit Ca-Cb is enabled to rotate in the forward direction and prevented from rotating in the reverse direction.

Figure 6:
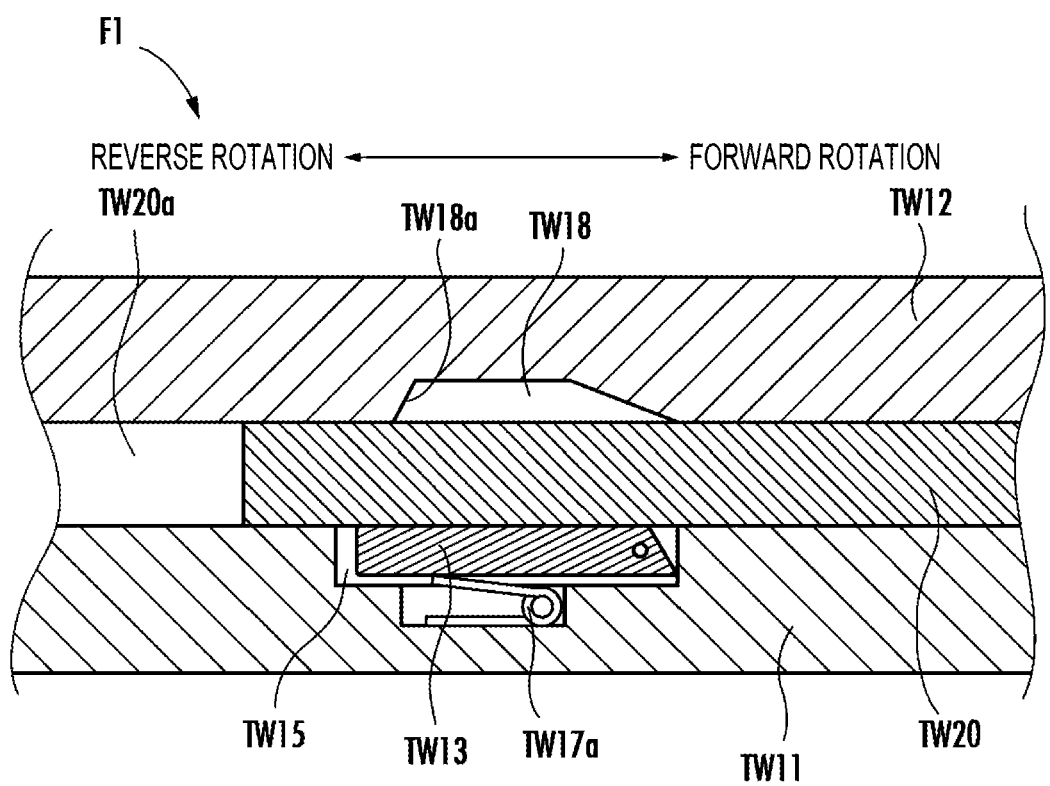
FIG. 6 is a sectional view illustrating the two-way clutch according to the embodiment in a reverse-rotation preventing state.
Figure 7:
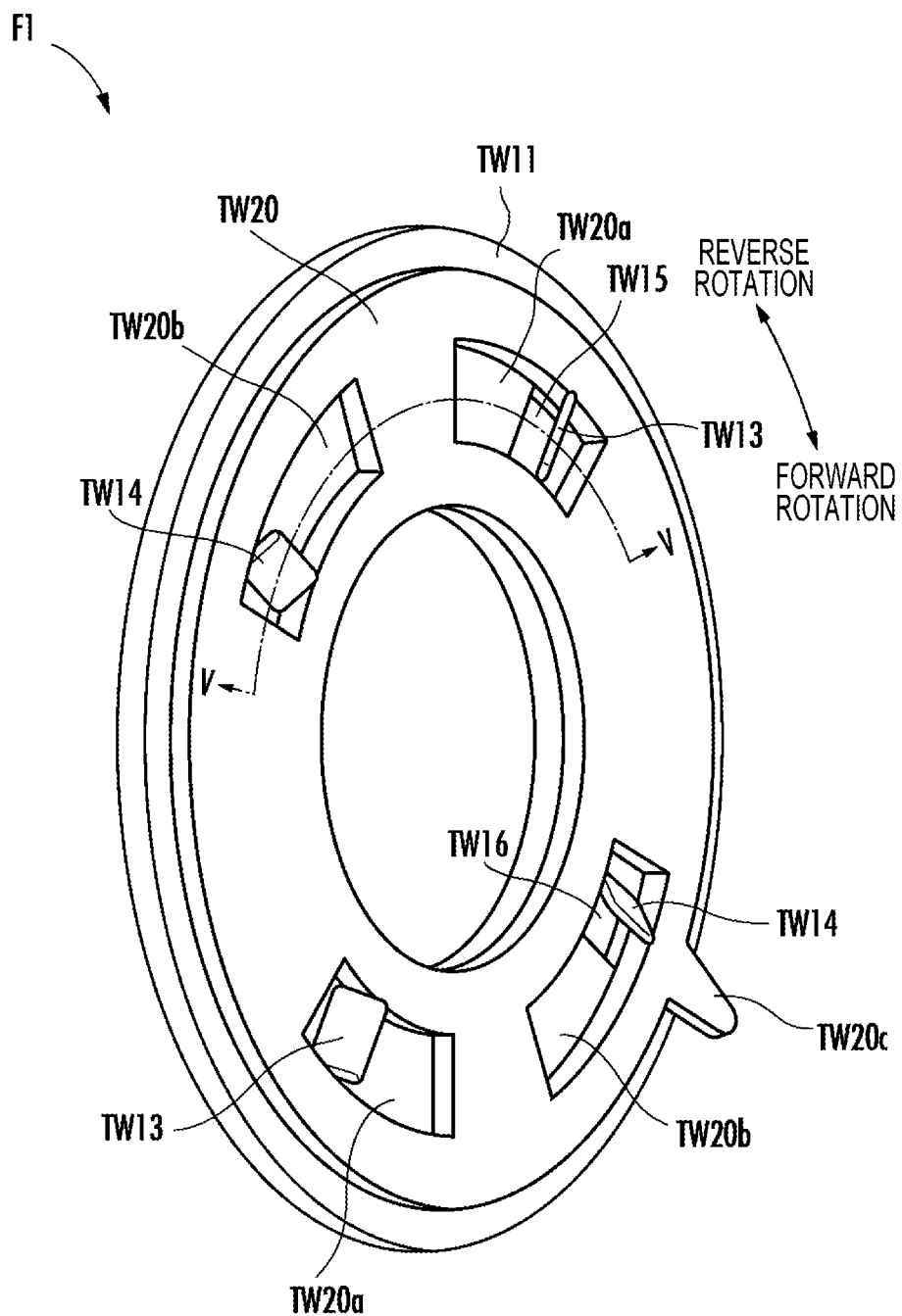
FIG. 7 is a perspective view illustrating the two-way clutch according to the embodiment in the fixed state.

As illustrated in the sectional views of FIGS. 5 and 6, the two-way clutch F1 includes a fixed plate TW11 that is fixed to the transmission case 10 and a rotatable plate TW12. As illustrated in FIG. 7, the fixed plate TW11 is annular shaped (donut shaped). Although not illustrated in FIG. 7, similar to the fixed plate TW11, the rotatable plate TW12 is also annular shaped (donut shaped). The fixed plate TW11 and the rotatable plate TW12 are arranged concentric to each other.

Referring to FIG. 5, a forward-rotation-preventing swing portion TW13 and a reverse-rotation-preventing swing portion TW14 are provided on an opposing surface TW11a of the fixed plate TW11 that opposes the rotatable plate TW12. The forward-rotation-preventing swing portion TW13 is plate-shaped, and an end portion thereof in one circumferential direction of the fixed plate TW11 (direction of forward rotation of the rotatable plate TW12) serves as a fulcrum around which an end TW13a in the other circumferential direction (direction of reverse rotation of the rotatable) swings. The reverse-rotation-preventing swing portion TW14 is plate-shaped, and an end portion thereof in the other circumferential direction of the fixed plate TW11 (direction of reverse rotation) serves as a fulcrum around which an end TW14a in the one circumferential direction (direction of forward rotation) swings.

The opposing surface TW11a of the fixed plate TW11 has receiving portions TW15 and TW16 that are recessed to be capable of receiving the forward-rotation-preventing swing portion TW13 and the reverse-rotation-preventing swing portion TW14, respectively. Urging members TW17a and TW17b famed of springs are provided on the bottom surfaces of the receiving portions TW15 and TW16, respectively. The urging members TW17a and TW17b respectively urge the swing portions TW13 and TW14 so that the swingable ends TW13a and TW14a of the swing portions TW13 and TW14 project from the receiving portions TW15 and TW16.

An opposing surface TW12a of the rotatable plate TW12 that opposes the fixed plate TW11 has hole portions TW18 and TW19 that are positioned so as to correspond to the swing portions TW13 and TW14. The first hole portion TW18, which is positioned so as to correspond to the forward-rotation-preventing swing portion TW13, has a first engagement portion TW18a. The first engagement portion TW18a is positioned at an end in the other circumferential direction of the rotatable plate TW12 (direction of reverse rotation), and is formed of a step engageable with the swingable end TW13a of the forward-rotation-preventing swing portion TW13.

The second hole portion TW19, which is positioned so as to correspond to the reverse-rotation-preventing swing portion TW14, has a second engagement portion TW19a. The second engagement portion TW19a is positioned at an end in the one circumferential direction of the rotatable plate TW12 (direction of forward rotation) and is famed of a step engageable with the swingable end TW14a of the reverse-rotation-preventing swing portion TW14.

As illustrated in FIGS. 5 and 7, when the end TW13a of each forward-rotation-preventing swing portion TW13 is engageable with the first engagement portion TW18a and when the end TW14a of each reverse-rotation-preventing swing portion TW14 is engageable with the second engagement portion TW19a, the rotatable plate TW12 is prevented from rotating in both forward and reverse directions. Accordingly, the state in which the ends TW13a and TW14a respectively engage with the engagement portions TW18a and TW19a corresponds to the fixed state of the two-way clutch F1 according to present embodiment.

A switching plate TW20 is disposed between the fixed plate TW11 and the rotatable plate TW12. As illustrated in FIG. 7, the switching plate TW20 is also annular shaped (donut-shaped). The switching plate TW20 has cuts TW20a and TW20b that are positioned so as to correspond to the swing portions TW13 and TW14.

Figure 8:
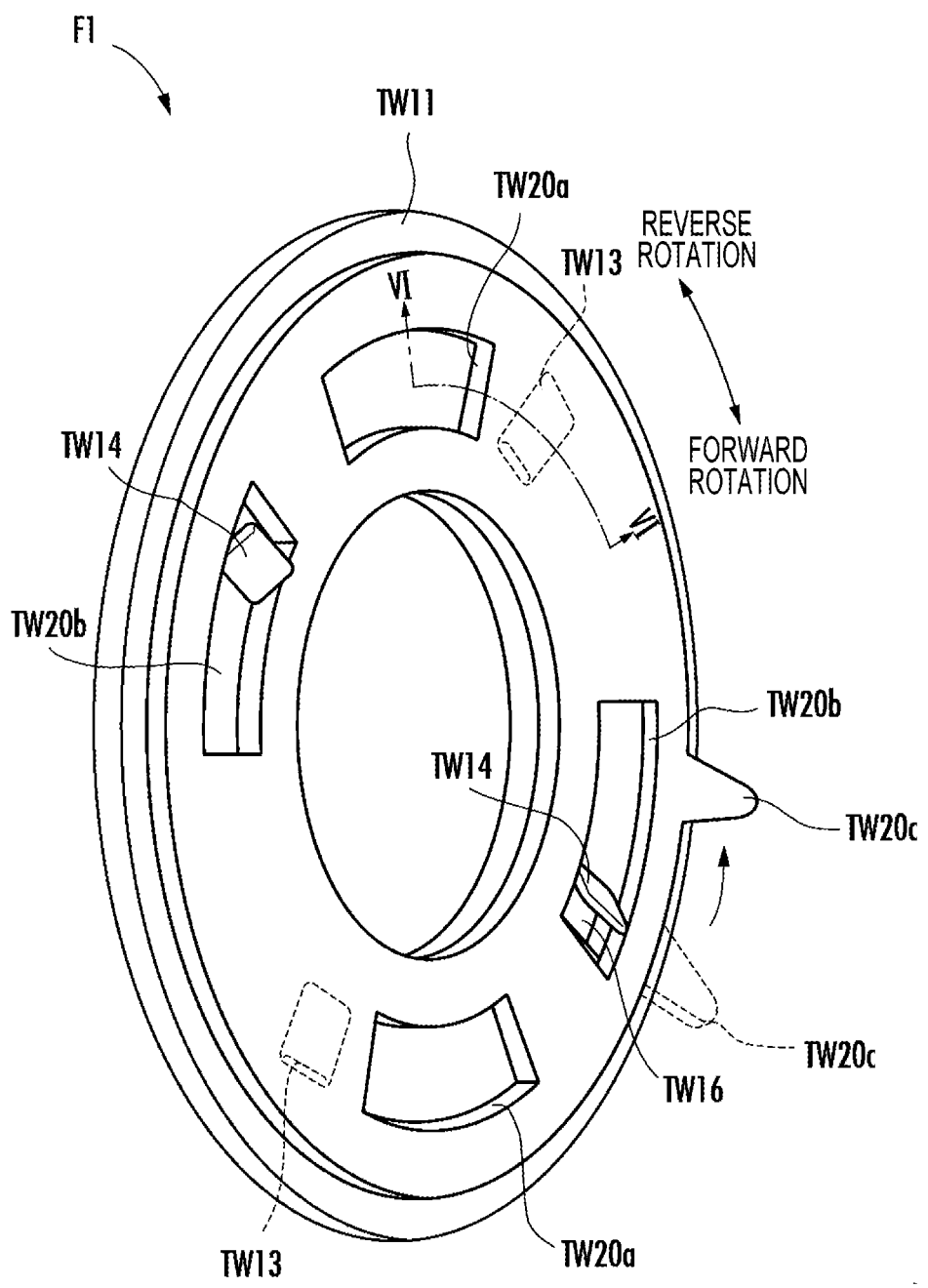
FIG. 8 is a perspective view illustrating the two-way clutch according to the embodiment in the reverse-rotation preventing state.

A projection TW20c that projects radially outward is provided at the outer periphery of the switching plate TW20. As illustrated in FIG. 8, the switching plate TW20 is rotatable relative to the fixed plate TW11.

When the switching plate TW20 is rotated from the fixed state illustrated in FIG. 7 to the state illustrated in FIG. 8, as illustrated in FIG. 6, each of the first cuts TW20a that correspond to the forward-rotation-preventing swing portions TW13 is moved beyond the corresponding forward-rotation-preventing swing portion TW13, so that the forward-rotation-preventing swing portion TW13 is pressed by the switching plate TW20 and pushed into the corresponding receiving portion TW15 against the urging force applied by the urging member TW17a. Accordingly, the end TW13a of the forward-rotation-preventing swing portion TW13 is released from the first engagement portion TW18a. As a result, the rotatable plate TW12 is enabled to rotate in the forward direction.

As illustrated in FIG. 8, the second cuts TW20b that correspond to the reverse-rotation-preventing swing portions TW14 are formed so that even when the switching plate TW20 is rotated from the fixed state illustrated in FIG. 7 to the state illustrated in FIG. 8, each reverse-rotation-preventing swing portion TW14 is not pushed into the corresponding receiving portion TW16 and the end TW14a is engageable with the second engagement portion TW19a.

Thus, the state illustrated in FIGS. 6 and 8 serves as the reverse-rotation preventing state of the two-way clutch F1 according to the present embodiment.

The structure that embodies the gist of the present disclosure will now be described. As illustrated in FIG. 2, the input shaft 11 includes the first input shaft 11a and the second input shaft 1ib. The first input shaft 11a and the second input shaft 1ib are coaxially integrated and connected together by a first spline engagement portion SPL1. The first input shaft 11a is disposed adjacent to the torque converter 2 and integrally supports the input side of the first clutch C1. The second input shaft 1ib integrally supports the sun gear Sc (first element) of the third planetary gear mechanism PG3 with a second spline engagement portion SPL2 provided therebetween.

When the power transmission device PT having the above-described structure is assembled, one end of the second input shaft 1ib is attached to the transmission case 10, and the first input shaft 11a is connected to the other end of the second input shaft 1ib. The fourth planetary gear mechanism PG4 is attached to the second input shaft 1ib before the second input shaft 1ib is attached to the transmission case 10.

At this time, it is difficult to attach the carrier Cd (fifth element) of the fourth planetary gear mechanism PG4 to the second input shaft 1ib while the sun gear Sc (first element) of the third planetary gear mechanism PG3 is attached to the second input shaft 1ib.

Since the sun gear Sc of the third planetary gear mechanism PG3 is engaged with the second input shaft lib by the second spline engagement portion SPL2, the carrier Cd of the fourth planetary gear mechanism PG4 may be attached to the second input shaft lib while the sun gear Sc of the third planetary gear mechanism PG3 is removed from the second input shaft lib. Then, the sun gear Sc of the third planetary gear mechanism PG3 may be engaged with the second input shaft lib. Thus, the assembly can be facilitated.

Next, the other elements of the third planetary gear mechanism PG3 are attached to the sun gear Sc in the region around the second input shaft lib installed in the transmission case 10. Then, the second planetary gear mechanism PG2 and the first planetary gear mechanism PG1 are attached to the second input shaft lib.

Then, the first input shaft 11a, which integrally supports the input side of the first clutch C1, is connected to the second input shaft lib by the first spline engagement portion SPL1, and is thereby integrated with the second input shaft lib to form the input shaft 11. Accordingly, the second planetary gear mechanism PG2 and the first planetary gear mechanism PG1 may be attached to the second input shaft 1ib without interfering with the first clutch C1, and the assembly can be facilitated.

The positions of the first spline engagement portion SPL1 and the second spline engagement portion SPL2 are selected based on the results of experiments conducted by the present inventors. The present inventors have measured the torque applied between the positions at which the first clutch C1 and the sun gear Sc are connected to the input shaft 11, the torque applied between the positions at which the sun gear Sc and the third clutch C3 are connected to the input shaft 11, the torque applied between the input shaft 11 and the first clutch C1, the torque applied between the input shaft 11 and the sun gear Sc, and the torque applied between the input shaft 11 and the third clutch C3, and compared the measured torques.

The results showed that the lowest torques are applied between the positions at which the first clutch C1 and the sun gear Sc are connected to the input shaft 11 and between the input shaft 11 and the sun gear Sc.

Thus, the first spline engagement portion SPL1 disposed between the positions at which the first clutch C1 and the sun gear Sc are connected to the input shaft 11 and the second spline engagement portion SPL2 disposed between the input shaft 11 and the sun gear Sc receive the lowest torques from the engine E. Therefore, the first spline engagement portion SPL1 and the second spline engagement portion SPL2 not only increase the assembly efficiency by enabling the input shaft 11 to be divided into the first input shaft 11a and the second input shaft 1ib, but also inhibits reduction in the durability of the input shaft 11.

In the present embodiment, the first spline engagement portion SPL1 and the second spline engagement portion SPL2 are both provided. However, the assembly efficiency can be increased from that in the related art as long as one of them is provided.

The automatic transmission 3 according to the present embodiment may instead be structured to shift between nine forward gear stages by omitting one of the gear stages (for example, the tenth gear stage).

In the present embodiment, the shift position is switched manually by operating the paddle shift lever 33. However, the method for switching the shift position is not limited to this, and may instead be switched by, for example, pressing a button. In this case, the selected shift position may be determined based on a button press signal.

In addition, although the two-way clutch F1 is used in the present embodiment, a wet multiplate brake and a one-way clutch provided on the brake may be used instead of the two-way clutch F1. In this case, the one-way clutch may be structured to enable the forward rotation and prevent the reverse rotation of the third connection unit Ca-Cb, and the wet multiplate brake may be engaged only when engine braking is to be applied in the reverse gear stage or the first gear stage.

Another example of a brake that may replace the two-way clutch F1 is a wet multiplate brake that is switchable between a fixed state in which the third connection unit Ca-Cb is fixed to the transmission case 10 and a state in which the third connection unit Ca-Cb is enabled to rotate.

The automatic transmission 3 of the present embodiment may instead be structured such that the third brake B3 is omitted and shifting between eight forward gear stages is performed.

In the present embodiment, the transmission mechanism (automatic transmission 3) is capable of establishing each gear stage by engaging three engagement mechanisms. However, similar effects can also be obtained by applying the present disclosure to a transmission mechanism capable of establishing each gear stage by engaging two engagement mechanisms or a transmission mechanism capable of establishing each gear stage by engaging four or more engagement mechanisms.

What is claimed is:

1. A power transmission device comprising:
an input shaft rotatably supported in a housing and configured to rotate by a driving force that is transmitted to the input shaft from a driving source mounted in a vehicle;
first to fourth planetary gear mechanisms, each comprising three elements that are a sun gear, a carrier, and a ring gear;
a plurality of engagement mechanisms; and
an output member that receives the driving force transmitted from the input shaft via the planetary gear mechanisms and the engagement mechanisms,
wherein the three elements of the third planetary gear mechanism are defined as a first element, a second element, and a third element in an order in which the elements are arranged from one side of an alignment chart at intervals corresponding to a gear ratio of the three elements of the third planetary gear mechanism,
wherein the three elements of the fourth planetary gear mechanism are defined as a fourth element, a fifth element, and a sixth element in an order in which the elements are arranged from the one side of the alignment chart at intervals corresponding to a gear ratio of the three elements of the fourth planetary gear mechanism,
wherein the three elements of the first planetary gear mechanism are defined as a seventh element, an eighth element, and a ninth element in an order in which the elements are arranged from the one side of the alignment chart at intervals corresponding to a gear ratio of the three elements of the first planetary gear mechanism,
wherein the three elements of the second planetary gear mechanism are defined as a tenth element, an eleventh element, and a twelfth element in an order in which the elements are arranged from the one side of the alignment chart at intervals corresponding to a gear ratio of the three elements of the second planetary gear mechanism,
wherein the first element is connected to the input shaft, the tenth element is connected to the output member, a first connection is formed by connecting the second element, the fifth element, and the ninth element together, a second connection is formed by connecting the third element and the twelfth element together, and a third connection is formed by connecting the eighth element and the eleventh element together,
wherein the engagement mechanisms include first to third clutches, first and second brakes, and another brake,
wherein the first clutch is switchable between a connected state in which the first element and the third connection are connected and a released state in which the first element and the third connection are disconnected,
wherein the second clutch is switchable between a connected state in which the second connection and the sixth element are connected and a released state in which the second connection and the sixth element are disconnected,
wherein the third clutch is switchable between a connected state in which the first element and the fourth element are connected and a released state in which the first element and the fourth element are disconnected,
wherein the first brake is switchable between a fixed state in which the seventh element is fixed to the housing and a released state in which the seventh element is released from the housing,
wherein the second brake is switchable between a fixed state in which the sixth element is fixed to the housing and a released state in which the sixth element is released from the housing,
wherein the other brake is switchable between a fixed state in which the third connection is fixed to the housing and a released state in which the third connection is released from the housing,
wherein the first clutch, the first planetary gear mechanism, the second planetary gear mechanism, the third planetary gear mechanism, the fourth planetary gear mechanism, and the third clutch are arranged along the input shaft in that order from the driving source,
wherein the input shaft includes a first input shaft and a second input shaft that are coaxially connected together through a first spline engagement portion and that are capable of being separated from each other in an axial direction,
wherein the first spline engagement portion is disposed between the first clutch and the first element of the third planetary gear mechanism on the input shaft,
wherein the first clutch is connected to the first input shaft,
wherein the first element of the third planetary gear mechanism and the third clutch are connected to the second input shaft,
wherein the first element of the third planetary gear mechanism is removably connected to the second input shaft through a second spline engagement portion,
wherein the first element is the sun gear of the third planetary gear mechanism,
wherein the power transmission device is configured such that: (i) a first torque is applied between a position at which the first clutch is connected to the input shaft and a position at which the first element is connected to the input shaft (ii) a second torque is applied between a position at which a position at which the first clutch is connected to the input shaft and a position at which the third clutch is connected to the input shaft (iii) a third torque is applied between the input shaft and the first clutch; (iv) a fourth torque is applied between the input shaft and the first element and (v) a fifth torque is applied between the input shaft and the third clutch, in which the first torque and the fourth torque are lower than each of the second torque, the third torque and the fifth torque, wherein the first spline engagement portion is disposed between the position at which the first clutch is connected to the input shaft and the position at which the first element is connected to the input shaft, to which the first torque is applied, and wherein the second spline engagement portion is disposed between the input shaft and the third clutch, to which the fourth torque is applied.

2. A power transmission device comprising:

an input shaft rotatably supported in a housing and configured to rotate by a driving force that is transmitted to the input shaft from a driving source mounted in a vehicle;

first to fourth planetary gear mechanisms, each comprising three elements that are a sun gear, a carrier, and a ring gear;

a plurality of engagement mechanisms; and an output member that receives the driving force transmitted from the input shaft via the planetary gear mechanisms and the engagement mechanisms, wherein the three elements of the third planetary gear mechanism are defined as a first element, a second element, and a third element in an order in which the elements are arranged from one side of an alignment chart at intervals corresponding to a gear ratio of the three elements of the third planetary gear mechanism, wherein the three elements of the fourth planetary gear mechanism are defined as a fourth element, a fifth element, and a sixth element in an order in which the elements are arranged from the one side of the alignment chart at intervals corresponding to a gear ratio of the three elements of the fourth planetary gear mechanism, wherein the three elements of the first planetary gear mechanism are defined as a seventh element, an eighth element, and a ninth element in an order in which the elements are arranged from the one side of the alignment chart at intervals corresponding to a gear ratio of the three elements of the first planetary gear mechanism, wherein the three elements of the second planetary gear mechanism are defined as a tenth element, an eleventh element, and a twelfth element in an order in which the elements are arranged from the one side of the alignment chart at intervals corresponding to a gear ratio of the three elements of the second planetary gear mechanism, wherein the first element is connected to the input shaft, the tenth element is connected to the output member, a first connection is formed by connecting the second element, the fifth element, and the ninth element together, a second connection is formed by connecting the third element and the twelfth element together, and a third connection is formed by connecting the eighth element and the eleventh element together, wherein the engagement mechanisms include first to third clutches, first and second brakes, and another brake, wherein the first clutch is switchable between a connected state in which the first element and the third connection are connected and a released state in which the first element and the third connection are disconnected, wherein the second clutch is switchable between a connected state in which the second connection and the sixth element are connected and a released state in which the second connection and the sixth element are disconnected, wherein the third clutch is switchable between a connected state in which the first element and the fourth element are connected and a released state in which the first element and the fourth element are disconnected, wherein the first brake is switchable between a fixed state in which the seventh element is fixed to the housing and a released state in which the seventh element is released from the housing, wherein the second brake is switchable between a fixed state in which the sixth element is fixed to the housing and a released state in which the sixth element is released from the housing, wherein the other brake is switchable between a fixed state in which the third connection is fixed to the housing and a released state in which the third connection is released from the housing, wherein the first clutch, the first planetary gear mechanism, the second planetary gear mechanism, the third planetary gear mechanism, the fourth planetary gear mechanism, and the third clutch are arranged along the input shaft in that order from the driving source, wherein the input shaft includes a first input shaft and a second input shaft that are coaxially connected together through a spline engagement portion and that are capable of being separated from each other in an axial direction, wherein the spline engagement portion is disposed between the first clutch and the first element of the third planetary gear mechanism on the input shaft, wherein the first clutch is connected to the first input shaft, wherein the first element of the third planetary gear mechanism and the third clutch are connected to the second input shaft, wherein the first element is the sun gear of the third planetary gear mechanism, wherein the power transmission device is configured such that: (i) a first torque is applied between a position at which the first clutch is connected to the input shaft and a position at which the first element is connected to the input shaft (ii) a second torque is applied between a position at which a position at which the first clutch is connected to the input shaft and a position at which the third clutch is connected to the input shaft (iii) a third torque is applied between the input shaft and the first clutch; (iv) a fourth torque is applied between the input shaft and the first element and (v) a fifth torque is applied between the input shaft and the third clutch, in which the first torque and the fourth torque are lower than each of the second torque, the third torque and the fifth torque, and wherein the spline engagement portion is disposed between the position at which the first clutch is connected to the input shaft and the position at which the first element is connected to the input shaft, to which the first torque is applied.

* * * * *